US012764821B2

(12) United States Patent
Watfa

(10) Patent No.: US 12,764,821 B2
(45) Date of Patent: Oct. 13, 2026

(54) METHOD AND APPARATUS FOR RECOVERY FROM FALLBACK FOR CELLULAR INTERNET OF THINGS DEVICE

(71) Applicant: Samsung Electronics Co., Ltd., Gyeonggi-do (KR)

(72) Inventor: Mahmoud Watfa, Middlesex (GB)

(73) Assignee: Samsung Electronics Co., Ltd (KR)

( * ) Notice: Subject to any disclaimer, the term of this patent is extended or adjusted under 35 U.S.C. 154(b) by 538 days.

(21) Appl. No.: 17/796,472

(22) PCT Filed: Jan. 29, 2021

(86) PCT No.: PCT/KR2021/001225
§ 371 (c)(1),
(2) Date: Jul. 29, 2022

(87) PCT Pub. No.: WO2021/154040
PCT Pub. Date: Aug. 5, 2021

(65) Prior Publication Data

US 2023/0354460 A1 Nov. 2, 2023

(30) Foreign Application Priority Data

Jan. 31, 2020 (GB) ...................................... 2001383
Feb. 1, 2020 (GB) ...................................... 2001411
Jan. 26, 2021 (GB) ...................................... 2101026

(51) Int. Cl.
*H04W 76/27* (2018.01)
*H04W 4/70* (2018.01)
(Continued)

(52) U.S. Cl.
CPC ............. *H04W 76/27* (2018.02); *H04W 4/70* (2018.02); *H04W 76/11* (2018.02); *H04W 76/12* (2018.02)

(58) Field of Classification Search
CPC ....... H04W 76/27; H04W 4/70; H04W 76/11; H04W 76/12
See application file for complete search history.

(56) References Cited

U.S. PATENT DOCUMENTS 10,701,587 B2 * 6/2020 Chaponniere ......... H04L 1/0072
2019/0149365 A1 * 5/2019 Chatterjee ............. H04W 76/11 370/329

(Continued)

FOREIGN PATENT DOCUMENTS

WO WO 2020/007438 1/2020

OTHER PUBLICATIONS

PCT/ISA/210 Search Report issued on PCT/KR2021/001225, Apr. 28, 2021, pp. 3.

(Continued)

*Primary Examiner* — Christine Ng
(74) *Attorney, Agent, or Firm* — The Farrell Law Firm, P.C.

(57) ABSTRACT

There is disclosed a first method for a UE, wherein the UE is in 5GMM-CONNECTED mode with RRC inactive indication. The first method comprises: establishing a PDU session for sending data over the control plane; determining that there is data to be sent in an UL NAS TRANSPORT message; in response to the determining, requesting lower layers to resume an RRC connection; and upon receiving a fallback indication from the lower layers in response to the requesting, entering 5GMM-IDLE mode. Also disclosed is a second method for a UE, wherein the UE is in 5GMM-CONNECTED mode with RRC inactive indication. The second method comprises: establishing a PDU session for sending data over the user plane; determining that there is user data to be sent over the user plane; determining that there is no pending NAS procedure; and upon receiving a fallback indication from the lower layers, in response to the (Continued)

determining, entering 5GMM-IDLE mode. Also disclosed is a third method for a UE, wherein the UE is in 5GMM-CONNECTED mode with RRC inactive indication. The third method comprises: in response to receiving, from lower layer, a suspend indication, determining the type of the suspend indication; and entering a NAS mode according to the determined type of the suspend indication.

12 Claims, 4 Drawing Sheets

(51) Int. Cl.
*H04W 76/11* (2018.01)
*H04W 76/12* (2018.01)

(56) References Cited

U.S. PATENT DOCUMENTS

| | | | | |
|---|---|---|---|---|
| 2019/0174449 | A1* | 6/2019 | Shan | H04W 60/00 |
| 2019/0182655 | A1* | 6/2019 | Gupta | H04W 8/04 |
| 2019/0254089 | A1* | 8/2019 | Huang-Fu | H04W 36/0016 |
| 2019/0254094 | A1* | 8/2019 | Babu | H04W 76/15 |
| 2020/0015311 | A1* | 1/2020 | Kim | H04W 68/005 |
| 2020/0323020 | A1* | 10/2020 | Liu | H04W 80/10 |
| 2020/0336953 | A1* | 10/2020 | Liu | H04W 48/02 |
| 2021/0084528 | A1* | 3/2021 | Kim | H04W 28/0242 |
| 2022/0078871 | A1* | 3/2022 | Won | H04W 76/19 |
| 2022/0377613 | A1* | 11/2022 | Watfa | H04W 28/0908 |

OTHER PUBLICATIONS

PCT/ISA/237 Written Opinion issued on PCT/KR2021/001225, Apr. 28, 2021, pp. 6.
3GPP TS 24.501 V16.3.0 Technical Specification Group Core Network and Terminals; Mar. 26, 2022, pp. 952.
3GPP TS 38.300, Technical Specification Group Radio Access Network; Apr. 13, 2022, pp. 204.
3GPP TS 24.501, Non-Access-Stratum (NAS) protocol for 5G System (5GS); Stage 3 Dec. 20, 2019, pp. 646.
Vivo, Samsung, C1-196944,Handling of pending NAS messages during resume of the N1 NAS signalling connection, Oct. 14, 2019, pp. 6.
Intel, Ericsson, InterDigital, C1-196575,Resolving Editor's Note for need of new EPD in CPSR message, Oct. 11, 2019, pp. 6.
Qualcomm Incorporated, C1-191254,Discussion on aspects related to fallback indication from the lower layers, Mar. 2019, pp. 8.
Ericsson, C1-194252,Aborting and re-triggerring ongoing NAS procedure when cell selection occurs, Aug. 26, 2019, pp. 23.
British Examination Report dated Dec. 22, 2022 issued in counterpart application No. GB2218151.5, 4 pages.
British Examination Report dated Jan. 12, 2023 issued in counterpart application No. GB2218152.3, 3 pages.
British Office Action dated May 5, 2023 issued in counterpart application No. GB2218151.5, 4 pages.

* cited by examiner

[Fig. 1]
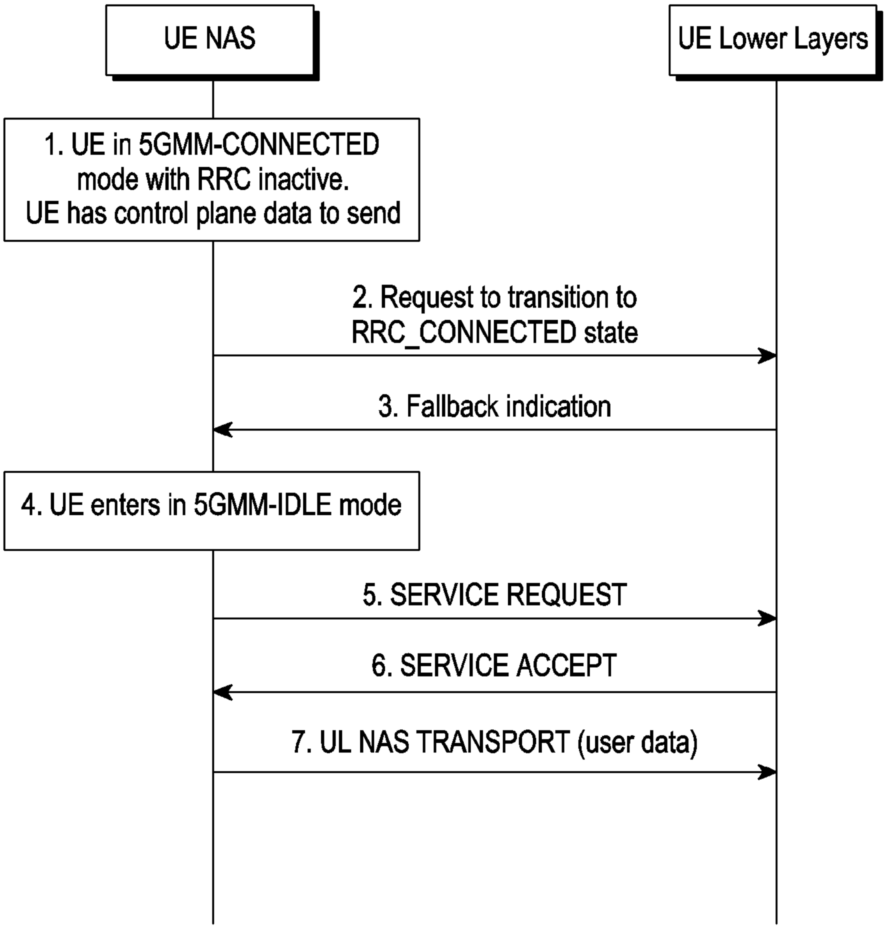

[Fig. 2]
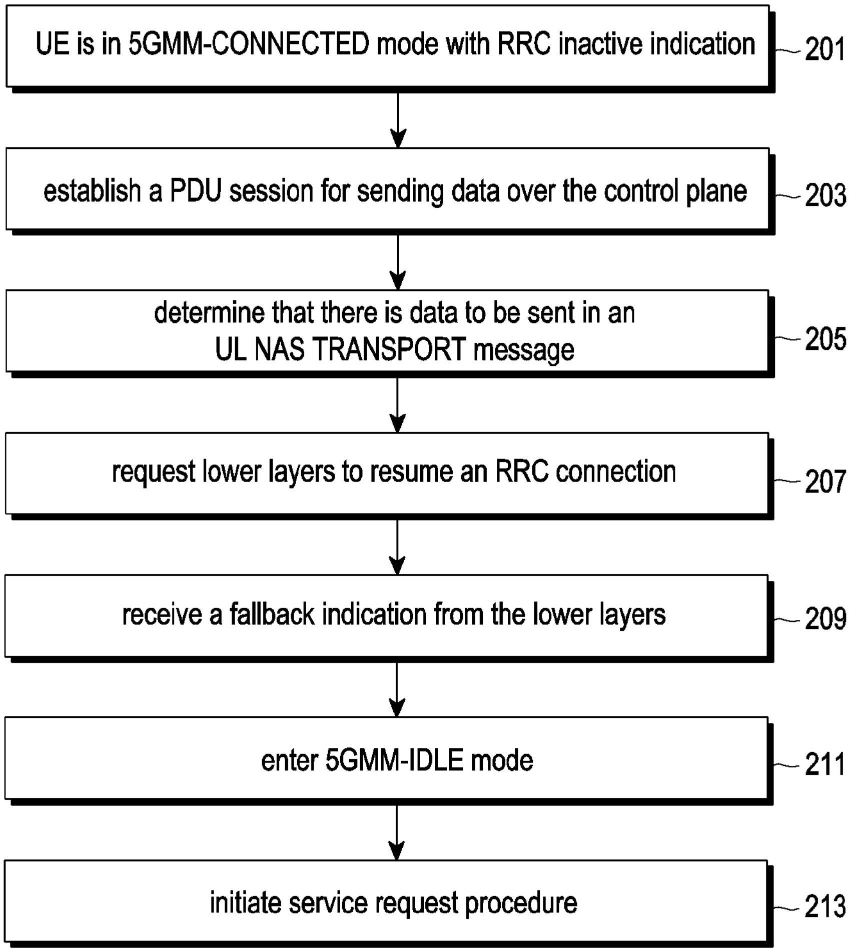

[Fig. 3]
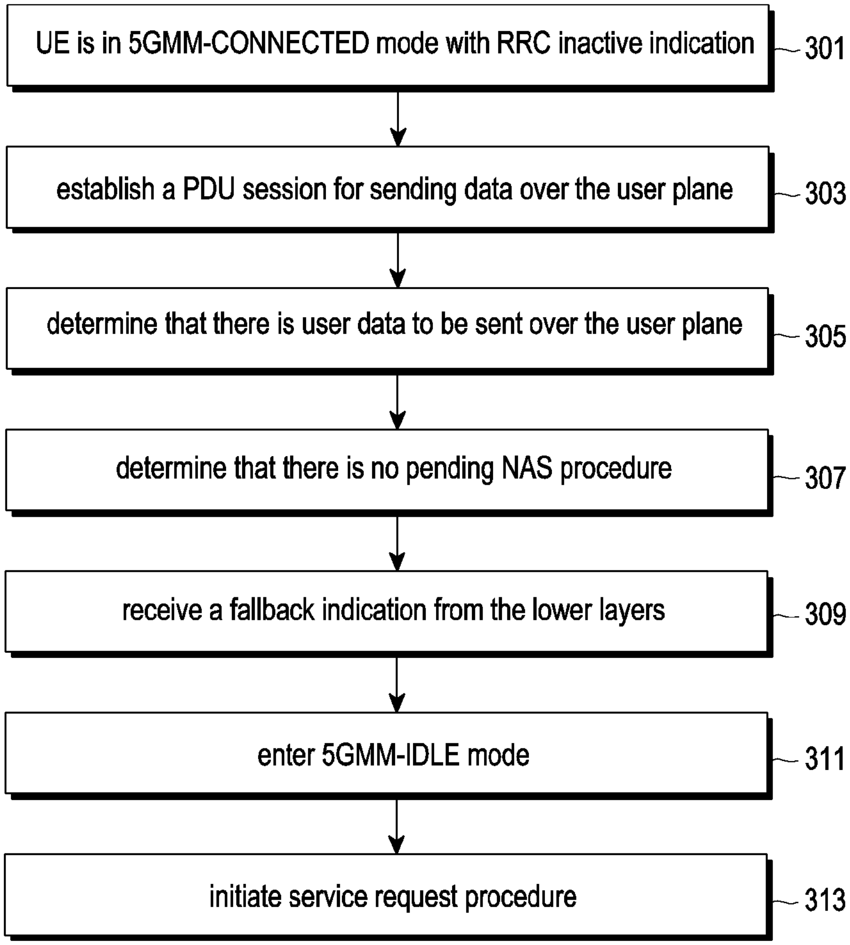
[Fig. 4]
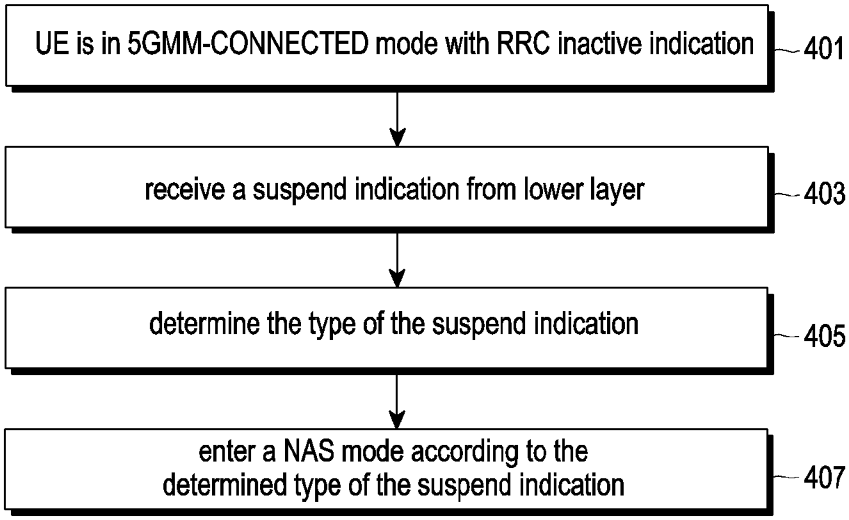

[Fig. 5]
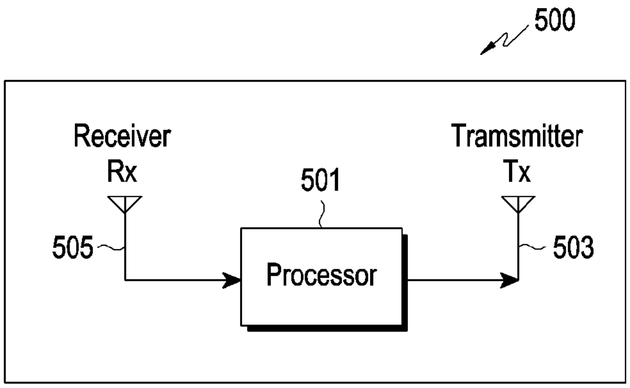

METHOD AND APPARATUS FOR RECOVERY FROM FALLBACK FOR CELLULAR INTERNET OF THINGS DEVICE

CROSS-REFERENCE TO RELATED APPLICATION(S)

This application is a U.S. National Phase Entry of PCT International Application No. PCT/KR2021/001225, which was filed on Jan. 29, 2021, and claims priority to United Kingdom Applications No. 2001383.5, 2001411.4, and 2101026.9, filed Jan. 31, 2020, Feb. 1, 2020, and Jan. 26, 2021, respectively, in the United Kingdom Intellectual Property Office, the disclosure of entirety of each of which is incorporated herein by reference.

TECHNICAL FIELD

Certain examples of the present disclosure provide methods and apparatus for recovery from fallback for cellular internet of things (CIoT), for example in the 3rd generation partnership project (3GPP) 5th generation (5G) standard.

BACKGROUND ART

To meet the demand for wireless data traffic having increased since deployment of 4th generation (4G) communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

It is an aim of certain examples of the present disclosure to address, solve and/or mitigate, at least partly, at least one of the problems and/or disadvantages associated with the related art, for example at least one of the problems and/or disadvantages described above. It is an aim of certain examples of the present disclosure to provide at least one advantage over the related art, for example at least one of the advantages described below.

Solution to Problem

The present invention is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

BRIEF DESCRIPTION OF DRAWINGS

For a better understanding of the invention, and to show how embodiments of the same may be carried into effect, reference will now be made, by way of example, to the accompanying diagrammatic drawings in which:

FIG. 1 illustrates the lack of specification and efficient mechanism for recovery from fallback for CIoT UEs;

FIG. 2 illustrates an example of a method for recovery from fallback indication according to an embodiment of the present disclosure;

FIG. 3 illustrates another example of a method for recovery from fallback indication according to an embodiment of the present disclosure;

FIG. 4 illustrates another example of a method for recovery from fallback indication according to an embodiment of the present disclosure; and FIG. 5 illustrates a block diagram of an exemplary entity that may be used in certain examples of the present disclosure.

MODE FOR THE INVENTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to “an object” includes reference to one or more of such objects.

Throughout the description and claims of this specification, language in the general form of “X for Y” (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

In the present disclosure, the following acronyms are used.

3GPP 3rd generation partnership project
5G 5th generation
5GMM 5G mobility management
5GS 5G system
AMF access and mobility management function
AS access stratum
CIoT cellular IoT
CPSR control plane service request
IE information element
IoT Internet of things
N1 interface for signaling between UE and AMF
NAS network access stratum
NB narrowband
NB-IoT narrowband IoT
PDU protocol data unit
RAN radio access network
Rel release
RRC radio resource control
TS technical specification
UE user equipment
UL uplink
WB wideband Herein, the following documents are referenced:

[1] 3GPP TS 24.501 V16.3.0
[2] 3GPP TS 38.300

Overview of 5GMM-CONNECTED Mode with RRC Inactive Indication

In 5G phase 1, one of the NAS modes that was defined in 3GPP TS 24.501 [1] is 5GMM-CONNECTED mode with RRC inactive indication. The UE is in 5GMM-CONNECTED mode with RRC inactive indication when the UE is in:

a) 5GMM-CONNECTED mode over 3GPP access at the NAS layer; and
b) RRC_INACTIVE state at the AS layer (see 3GPP TS 38.300 [2]).

When the UE has an uplink NAS message to send, the NAS requests the lower layers to resume the connection as specified in [1]:

Upon:

a trigger of a procedure which requires sending of a NAS message different from a REGISTRATION REQUEST message with the NG-RAN-RCU bit of the 5GS update type IE set to “NG-RAN radio capability update needed”; or an uplink user data packet to be sent for a PDU session with suspended user-plane resources;

the UE in 5GMM-CONNECTED mode with RRC inactive indication over 3GPP access shall request the lower layers to transition to RRC_CONNECTED state (see 3GPP TS 38.300 [27]).

Transitions between 5GMM-CONNECTED mode and 5GMM-CONNECTED mode with RRC inactive indication occurs as follows [1]:

the UE shall transition from 5GMM-CONNECTED mode over 3GPP access to 5GMM-CONNECTED mode with RRC inactive indication upon receiving an indication from the lower layers that the RRC connection has been suspended the UE shall transition from 5GMM-CONNECTED mode with RRC inactive indication to 5GMM-CONNECTED mode over 3GPP access upon receiving an indication from the lower layers that the UE has transitioned to RRC_CONNECTED state.

The UE (NAS) in 5GMM-CONNECTED mode with RRC inactive indication requests the lower layers to resume a connection when there is:

a trigger of a procedure which requires sending of a NAS message different from a REGISTRATION REQUEST message with the NG-RAN-RCU bit of the 5GS update type IE set to “NG-RAN radio capability update needed”, or an uplink user data packet to be sent for a PDU session with suspended user-plane resources.

However, it is not always the case that the resumption of a suspended connection (i.e. due to being in RRC inactive state) will be successful. The lower layers (RRC) may not succeed in resuming a connection and hence the UE (NAS) must enter 5GMM-IDLE mode and re-establish the NAS connection from 5GMM-IDLE mode. This may be due to a fallback indication from the lower layers. The cases in which the UE enters 5GMM-IDLE mode following a fallback indication from the lower layers, and the expected NAS behavior are reproduced below from [1]:

If the UE requests the lower layers to transition to RRC_CONNECTED state at initiation of a registration procedure, a service request procedure or a de-registration procedure, upon fallback indication from lower layers, the UE shall:

enter 5GMM-IDLE mode;

proceed with the pending procedure; and if the pending procedure is a service request or registration request procedure, the UE shall include the Uplink data status IE in the SERVICE REQUEST message, or in the REGISTRATION REQUEST message, indicating the PDU session(s) without active user-plane resources for which the UE has pending user data to be sent, if any, and the PDU session(s) for which user-plane resources were active prior to receiving the fallback indication, if any (see subclauses 5.5.1.3 and 5.6.1 for further details).

If the UE requests the lower layers to transition to RRC_CONNECTED state for other reason than initiation of a registration procedure, or for other reason than a service request procedure, or for other reason than a de-registration procedure, upon fallback indication from lower layers, the UE shall:

enter 5GMM-IDLE mode;

initiate service request procedure and include the Uplink data status IE in the SERVICE REQUEST message indicating the PDU session(s) for which user-plane resources were active prior to receiving the fallback indication, if any (see subclause 5.6.1 for further details); and upon successful service request procedure completion, proceed with any pending procedure.

If the UE in 5GMM-CONNECTED mode with RRC inactive indication receives a fallback indication from lower layers, and the UE has pending uplink user data for PDU session(s) with user-plane resources already established but no pending NAS procedure, the UE shall:

enter 5GMM-IDLE mode; and initiate the service request procedure and include the Uplink data status IE in the SERVICE REQUEST message indicating the PDU session(s) for which user-plane resources were active prior to receiving the fallback indication (see subclause 5.6.1 for further details).

It should be noted that 5GMM-CONNECTED mode with RRC inactive indication is not applicable to UEs in NB-N1 mode (i.e. NB-IoT UEs) however UEs in WB-N1 mode (i.e. CIoT devices on WB-N1 mode) support 5GMM-CONNECTED mode with RRC inactive indication and hence all the requirements of this mode apply in WB-N1 mode.

Overview of Control Plane and User Plane CIoT 5GS Optimizations

5G CIoT was introduced in Rel-16 and enables the transmission of data over the control plane amongst many other features. The use of control plane CIoT 5GS optimization is applicable to UEs in WB-N1 (wide-band-N1) mode and NB-N1 (narrow-band-N1) mode.

When using control plane CIoT 5GS optimization, the UE in 5GMM-IDLE mode (hereafter referred to as idle mode) sends data over NAS by sending the Control Plane Service Request (CPSR) message that includes the data as specified in [1]. Once in 5GMM-CONNECTED mode (hereafter referred to as connected mode), the UE uses the UL NAS TRANSPORT message to send more uplink (UL) data. Therefore, for a (WB-N1 mode) UE that is using control plane CIoT 5GS optimization and that is in 5GMM-CONNECTED mode with RRC inactive indication, if the UE has data over NAS to be sent the UE will request the lower layers to transition to RRC_CONNECTED state.

When using user plane CIoT 5GS optimization, the UE suspends and resumes its connection as specified in [1]. The UE behaviour is reproduced below from [1]:

Suspend of the N1 NAS signaling connection can be initiated by the network in 5GMM-CONNECTED mode when user plane CIoT 5GS optimization is used. Resume of the suspended N1 NAS signaling connection is initiated by the UE.

In the UE, when user plane CIoT 5GS optimization is used:

Upon indication from the lower layers that the RRC connection has been suspended, the UE shall enter 5GMM-IDLE mode with suspend indication, shall not consider the N1 NAS signaling connection released and shall not consider the secure exchange of NAS messages terminated (see subclause 4.4.2.5 and 4.4.5).

Upon trigger of a procedure using an initial NAS message when in 5GMM-IDLE mode with suspend indication, the UE shall:

i) if the initial NAS message is a REGISTRATION REQUEST message with the NG-RAN-RCU bit of the 5GS update type IE set to "NG-RAN radio capability update needed", enter 5GMM-IDLE mode without suspend indication and proceed with the registration procedure; or ii) otherwise, request the lower layer to resume the RRC connection.

NOTE 1: In NB-N1 mode, in the request to the lower layer the data volume information of the initial NAS message is provided to the lower layers. Interactions between the NAS and the lower layers in order to obtain the data volume information of the initial NAS message (see 3GPP TS 36.321 [25E], 3GPP TS 36.331 [22]) is left to implementations.

Upon indication from the lower layers that the RRC connection has been resumed when in 5GMM-IDLE mode with suspend indication, the UE shall enter 5GMM-CONNECTED mode. If the pending NAS message is:

i) a SERVICE REQUEST message, the service type IE is not set to "emergency services fallback", and the UE did not include the NAS message container IE in the SERVICE REQUEST message; or ii) a CONTROL PLANE SERVICE REQUEST message, and the UE did not include the CIoT small data container IE or the NAS message container IE in the CONTROL PLANE SERVICE REQUEST message, the message shall not be sent. Otherwise the UE shall cipher the message as specified in subclause 4.4.5 and send the pending initial NAS message upon entering 5GMM-CONNECTED mode;

NOTE 2: If a NAS message is discarded and not sent to the network, the uplink NAS COUNT value corresponding to that message is reused for the next uplink NAS message to be sent.

Upon fallback indication from the lower layers at RRC connection resume when in 5GMM-IDLE mode with suspend indication, the UE shall enter 5GMM-IDLE mode without suspend indication, send any pending initial NAS message and proceed as if RRC connection establishment had been requested;

Upon indication from the lower layers that the RRC connection resume has failed and indication from the lower layers that the RRC connection is suspended, the UE shall enter 5GMM-IDLE mode with suspend indication and restart the ongoing NAS procedure if required; and Upon indication from the lower layers that the RRC connection resume has failed and indication from the lower layers that the RRC connection is not suspended, the UE shall enter 5GMM-IDLE mode without suspend indication and restart the ongoing NAS procedure if required.

In the network, when user plane CIoT 5GS optimization is used:

Upon indication from the lower layers that the RRC connection has been suspended, the network shall enter 5GMM-IDLE mode with suspend indication, shall not consider the N1 NAS signaling connection released and shall not consider the secure exchange of NAS messages terminated; and Upon indication from the lower layers that the RRC connection has been resumed when in 5GMM-IDLE mode with suspend indication, the network shall enter 5GMM-CONNECTED mode.

From the above, it is clear that the UE which is using user plane CIoT 5GS optimization will enter 5GMM-IDLE mode with suspend indication upon reception of an indication from the lower layers that the RRC connection has been suspended.

It should also be noted that a UE may actually use both the control plane CIoT 5GS optimization and the user plane CIoT 5GS optimization at the same time. This can occur, for example for a UE that supports both optimizations and for which at least one PDU session is setup for control plane CIoT 5GS optimization where this session can be switched to user plane i.e. the UE can request the establishment of user plane resources for a PDU session that was established for control plane CIoT 5GS optimization. When this occurs, i.e. when user plane resources get established, if the UE also had indicated that user plane CIoT 5GS optimization is supported, the network may suspend the UE's resources at the RAN. Certain examples of the present disclosure provide methods, apparatus and systems for recovery from fallback for CIoT, for example in the 3GPP 5G standard. However, the skilled person will appreciate that the present invention is not limited to these examples, and may be applied in any suitable system or standard, for example one or more existing and/or future generation wireless communication systems or standards.

The following examples are applicable to, and use terminology associated with, 3GPP 5G. However, the skilled person will appreciate that the techniques disclosed herein are not limited to 3GPP 5G. For example, the functionality of the various network entities disclosed herein may be applied to corresponding or equivalent entities in other communication systems or standards. Corresponding or equivalent entities may be regarded as entities that perform the same or similar role within the network. The skilled person will also appreciate that the transmission of information between network entities is not limited to the specific form or type of messages described in relation to the examples disclosed herein.

A particular network entity may be implemented as a network element on a dedicated hardware, as a software instance running on a dedicated hardware, and/or as a virtualised function instantiated on an appropriate platform, e.g. on a cloud infrastructure.

The skilled person will appreciate that the present invention is not limited to the specific examples disclosed herein. For example:

- The techniques disclosed herein are not limited to 3GPP 5G.
- One or more entities in the examples disclosed herein may be replaced with one or more alternative entities performing equivalent or corresponding functions, processes or operations.
- One or more of the messages in the examples disclosed herein may be replaced with one or more alternative messages, signals or other type of information carriers that communicate equivalent or corresponding information.
- One or more further elements or entities may be added to the examples disclosed herein.
- One or more non-essential elements or entities may be omitted in certain examples.
- The functions, processes or operations of a particular entity in one example may be divided between two or more separate entities in an alternative example.
- The functions, processes or operations of two or more separate entities in one example may be performed by a single entity in an alternative example.
- Information carried by a particular message in one example may be carried by two or more separate messages in an alternative example.
- Information carried by two or more separate messages in one example may be carried by a single message in an alternative example.
- The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system comprising one or more such apparatuses/devices/network entities, and/or a method therefor.

At least the following two problems exist in view of the related art:

- Inefficient recovery from RRC fallback indication when sending data over NAS from 5GMM-CONNECTED mode with RRC inactive indication.
- Ambiguity at the NAS when a suspend indication is received from the lower layers These two problems are discussed in the following sections.

Inefficient Recovery from RRC Fallback Indication

FIG. 1 shows the problem with the current specification that does not consider recovery from fallback for CIoT devices that are using control plane CIoT 5GS optimization. Referring to FIG. 1, for the WB-N1 mode UE that is using control plane CIoT 5GS optimization and that is in 5GMM-CONNECTED mode with RRC inactive indication at step 1, if the UE has data over NAS to be sent the UE will request the lower layers to transition to RRC_CONNECTED state at step 2. However, if the resume of the RRC connection fails, the lower layers will provide a fallback indication to the NAS at step 3. Moreover, as per [1], when the UE in 5GMM-CONNECTED mode over 3GPP access receives a fallback indication from lower layers, and the UE has a pending NAS procedure other than a registration procedure, a service request procedure, or a de-registration procedure, the UE shall:

a) enter 5GMM-IDLE mode at step 4;

b) initiate the service request procedure and include the Uplink data status IE in the SERVICE REQUEST message indicating the PDU session(s) for which user-plane resources were active prior to receiving the fallback indication, if any (see subclause 5.6.1 for further details) at step 5; and c) upon successful service request procedure completion at step 6, proceed with any pending procedure at step 7.

As can be seen from FIG. 1, during recovery from fallback, the UE can only send data at step 7. In fact, the UE using control plane CIoT 5GS optimization cannot send a SERVICE REQUEST message and hence the specification does not address such UEs.

According to the above, since the UE has to send data with the UL NAS TRANSPORT message, which is the pending procedure, then the UE has to enter 5GMM-IDLE mode, initiate the service request procedure and include the Uplink data status IE in the SERVICE REQUEST message, etc., and after which the UE then continues with the pending procedure.

The first problem with this is that the UE that uses control plane CIoT 5GS optimization does not send the SERVICE REQUEST message but rather sends the CONTROL PLANE SERVICE REQUEST message. As such, the specification does not currently address fallback for UEs that are using control plane CIoT 5GS optimization. Moreover, since CIoT data (or data over NAS) can be included in the CPSR message, it becomes inefficient and unnecessary for the UE to first perform a service request procedure and then follow up with the pending procedure (in this case being the UL NAS TRANSPORT message) to send data over NAS.

Ambiguity at the NAS

As stated earlier, Rel-15 supported the UE entering 5GMM-CONNECTED mode with RRC inactive indication. The trigger to enter this mode is the reception of a suspend indication from the lower layers.

In Rel-16, as part of 5G CIoT work, when a UE that is using user plane CIoT 5GS optimization receives a suspend indication from the lower layers, the UE enters 5GMM-IDLE with suspend indication as specified in [1].

The problem identified here is that the UE gets the same indication from lower layers i.e. suspend indication, but the NAS has two different modes, i.e. 5GMM-CONNECTED mode with RRC indication or 5GMM-IDLE mode with suspend indication, that can be entered as a result of the same indication. Hence a more evident indication is needed to resolve this ambiguity.

Certain examples of the present disclosure provide enhancements to the NAS protocol and entity for handling NAS messages and NAS entity modes when 5G CIoT services are in use. Specifically, certain examples of the present disclosure provide the following:

- Recovery from fallback indication for UEs that use control plane CIoT 5GS optimization: An efficient methods to handle fallback indications from the lower layers whereby the NAS re-establishes the NAS signaling connection by sending a Control Plane Service Request message with the data. This should be done instead of the current specification that requires sending a Service Request message followed by UL NAS TRANSPORT with the data. The latter involves more signaling and is hence inefficient.
- New indication for suspend due to user plane CIoT 5GS optimization: A new indication from the lower layers that enables the NAS to enter the corresponding and correct mode due to suspend for user plane CIoT 5GS optimization.

These are discussed in the following sections.

Recovery from Fallback Indication

FIG. 2 illustrates an example of a method for recovery from fallback indication according to an embodiment of the present disclosure.

Referring to FIG. 2, when the UE in 5GMM-CONNECTED mode with RRC inactive indication at step 201, the UE is using control plane CIoT 5GS optimization (and/or user plane CIoT 5GS optimization), the UE has at least one PDU session established for sending data over the control plane at step 203. The UE requests the lower layers to resume the connection at step 207 as there is CIoT user data (i.e. data over the control plane) to send in the UL NAS TRANSPORT message at step 205. Upon receiving a fallback indication from lower layers in response to the requesting at step 209, the UE shall:

- enter 5GMM-IDLE mode at step 211, and
- initiate the service request procedure by sending the Control Plane Service Request message with the CIoT user data (i.e. the data over control plane) at step 213. The Control Plane Service Request message should include (at least) the same data and PDU session identity that the UE needed to send in the UL NAS TRANSPORT before the fallback indication was received.

If the UL NAS TRANSPORT that triggered the request to the lower layers to resume the connection had multiple payloads where one of the payload types is CIoT user data, the UE should follow the same behavior that is proposed above by first sending a Control Plane Service Request message from idle mode. After transitioning to 5GMM-CONNECTED mode, the UE can then continue with the other procedures to send other payload types (including multiple payloads) that the UE needed to send prior to the reception of the fallback indication from the lower layers.

If the UL NAS TRANSPORT that triggered the request to the lower layers to resume the connection had multiple payloads where at least one or more of the payload types is a type of data, where the data is any data that can be sent by a UE using the Control Plane Service Request (CPSR) message (e.g. CIoT user data, SMS, location services message, or any other message that can be defined and allowed to be sent via the CPSR message), then when the UE gets an indication about fallback e.g. from the lower layers, the UE should transition to 5GMM-IDLE mode and then send the CPSR message and include at least one data type in the CPSR message. Since there may have been more than one type of data that the UE wanted to send in the UL NAS TRANSPORT message (i.e. before the fallback indication was received), then the UE should decide which of the data types it should include in the CPSR message. Then, after the transition to 5GMM-CONNECTED mode, the UE should then send the other data types that are not yet sent by using the UL NAS TRANSPORT message again. The UE may determine which data type to send in the CPSR message using any of the following methods:

- The UE may always decide to prioritize and send CIoT user data in the CPSR message, e.g. optionally if the UE had CIoT user data to send before the fallback indication was received (e.g. by the NAS from the lower layers).
- The UE may always decide to prioritize and send location services message in the CPSR message, e.g. optionally if the UE had location services message to send before the fallback indication was received (e.g. by the NAS from the lower layers).
- The UE may always decide to prioritize and send SMS in the CPSR message, e.g. optionally if the UE had SMS to send before the fallback indication was received (e.g. by the NAS from the lower layers).
- The UE may always decide to prioritize and send any other data type in the CPSR message, e.g. optionally if the UE had that data type to send before the fallback indication was received (e.g. by the NAS from the lower layers), where the data type may be any other data type that can be sent in the CPSR message e.g. LPP message, or any other new data type that may be defined in the future and that may be allowed to be sent in the CPSR message (e.g. data or message related to proximity based services, etc).
- The UE may make any of the above prioritization based on configuration in the UE, where this configuration may be pre-configured in the UE, or USIM, or may be received from the network via any means such as any container and/or over any NAS message.
- The UE may make any of the above prioritization using implementation specific methods.

Note that the UE may need to recover from fallback indication with a service request procedure but by sending a CPSR message when e.g. the UE receives a fallback indication upon request to resume a connection and there was no pending NAS procedure. When the UE transitions to 5GMM-IDLE mode and then attempts to recover from the fallback by sending a CPSR message, the UE, at this time, may actually have data (e.g. any of the data types that are listed above e.g. CIoT user data, SMS, location services message, etc) to send over the CPSR message. So even though the data that needs to be sent was not available at the time when the NAS requested the lower layers to resume the connection, the UE should still send the CPSR message and include the data in the CPSR message if this data is available at the time of sending, or just before sending, the CPSR message. If needed, the UE may also include the Uplink data status IE to request the establishment of user plane resources for one or more PDU sessions.

When sending the Control Plane Service Request as proposed above, the UE should include the Uplink data status IE in the Control Plane Service Request message indicating the PDU session(s) for which user-plane resources were active prior to receiving the fallback indication, if any.

When sending the Control Plane Service Request as proposed above, the UE should not perform access barring check so that double barring is avoided.

FIG. 3 illustrates another example of a method for recovery from fallback indication according to an embodiment of the present disclosure. Referring to FIG. 3, the UE may be using control plane CIoT 5GS optimization with at least one PDU session for which the UE can request the establishment of user-plane resources. The UE in 5GMM-CONNECTED mode with RRC_inactive indication may have a trigger to request the establishment of user-plane resources for such PDU sessions. For example, when the UE in 5GMM-CONNECTED mode with RRC inactive indication at step 301, UE establishes at least one PDU session for sending data over the user plane at step 303.

Thereafter UE determines that there is user data to be sent over the user plane at step 305 and determines that there is no pending NAS procedure at step 307. Upon receiving a fallback indication from the lower layer at step 309, in response to the determining, UE enters 5GMM-IDLE mode at step 311. Namely, when the UE in 5GMM-CONNECTED mode over 3GPP access receives a fallback indication from lower layers, and the UE has pending Uplink user data for PDU session(s) with user-plane resources already established but no pending NAS procedure, the UE that is using control plane CIoT 5GS optimization shall:

- enter 5GMM-IDLE mode at step 311; and
- initiate the service request procedure at step 313 and include the Uplink data status IE in the Control Plane Service Request message indicating the PDU session(s) for which user-plane resources were active prior to receiving the fallback indication.

Therefore, based on whether the UE is using control plane CIoT 5GS optimization or not, the UE should send the following NAS message after entering 5GMM-IDLE mode following the reception of a fallback indication from the lower layers:

- if the UE is using control plane CIoT 5GS optimization, the UE should reestablish the NAS connection by sending a Control Plane Service Request message,
- if the UE is not using control plane CIoT 5GS optimization, or if the UE is using user plane CIoT 5GS optimization, the UE should re-establish the NAS connection by sending a Service Request message.

New Indication for Suspend Due to User Plane CIoT 5GS Optimization

In order to remove any ambiguity at the NAS, and for the purpose of entering the appropriate NAS mode based on actions or state transitions in the lower layers, in certain examples of the present disclosure the lower layers should provide a different indication to differentiate a suspend in the lower layers due to the RRC entering RRC_inactive state, from a suspend in the lower layers due to the use of user plane CIoT 5GS optimization.

Since in Rel-15 the lower layers already provided a suspend indication when the lower layers enter RRC_inactive state, certain examples of the present disclosure use a new/different indication by the lower layers where this indication is provided to the NAS upon suspension of the RRC connection/state due to the use of user plane CIoT 5GS optimization. For example, a new "suspend due to user plane CIoT 5GS optimization" can be defined and used for this purpose. Upon reception of this indication (or any other new indication that can also be defined for this purpose) from the lower layers, the UE (NAS) shall enter 5GMM-IDLE mode with suspend indication.

A new resume indication can also be defined for this purpose to differentiate a resume after entering RRC_CONNECTED from RRC_inactive state from a resume after resuming an RRC connection as part of user plane CIoT 5GS optimization.

FIG. 4 illustrates another example of a method for recovery from fallback indication according to an embodiment of the present disclosure.

Referring to FIG. 4, when the UE in 5GMM-CONNECTED mode with RRC inactive indication at step 401, the UE receives a suspend indication from lower layer at step 403. The UE determines a type of the suspend indication at step 405, in response to the receiving the suspend indication. Thereafter, UE enters a NAS mode according to the determined type of the suspend indication at step 407. Wherein if the suspend indication is a first type indicating a suspend in the lower layers due to the RRC entering RRC_inactive state, UE enters 5GMM-CONNECTED mode with RRC inactive indication. And if the suspend indication is a second type indicating a suspend due to the use of user plane CIoT 5GS optimisation, UE enters 5GMM-IDLE mode with suspend indication.

In the related art, the UE behavior for recovering from fallback in cases when control plane CIoT 5GS optimization is not defined. If the existing specification were to be applied, the signaling involved for recovering from fallback when the UE has CIoT user data to send will lead to more signaling thereby making the recovery inefficient. Certain examples of the present disclosure specify the UE behavior for the scenario in question and provide a solution that is efficient in terms of signaling.

In certain examples of the present disclosure, the lower layers provide a new indication for suspend due to use of user plane CIoT 5GS optimization. This enables the NAS to enter the correct mode, thereby removing ambiguity at the NAS which can lead to a wrong UE behavior and unexpected behavior across different UEs. In certain examples of the present disclosure, the correct mode may be entered by the UE based on the new indication that the lower layers provide to the NAS.

Certain examples of the present disclosure provide a method for a User Equipment (UE), wherein the UE is in 5GMM-CONNECTED mode with RRC inactive indication, the method comprising: establishing a PDU session for sending data over the control plane; determining that there is data to be sent in an UL NAS TRANSPORT message; in response to the determining, requesting lower layers to resume an RRC connection; and upon receiving a fallback indication from the lower layers in response to the requesting, entering 5GMM-IDLE mode.

In certain examples, the method may further comprise: if the UE is using control plane CIoT 5GS optimisation, sending a Control Plane Service Request (CPSR) message including at least a portion of the data.

In certain examples, sending the CPSR message may comprise sending the CPSR message if the UE is re-establishing a NAS connection following the fallback indication, and the UE has data to send over the control plane before the fallback indication is received.

In certain examples, the CPSR may further include a PDU session identity corresponding to the PDU session.

In certain examples, the data to be sent in the UL NAS TRANSPORT message may comprise multiple payloads including CIoT user data and one or more other payload types, and the data included in the CPSR message may comprise the CIoT user data.

In certain examples, the method may further comprise: transitioning to 5GMM-CONNECTED mode; and performing a procedure to send the data of the one or more other payload types.

In certain examples, the CPSR message may comprise an Uplink data status IE indicating the PDU session(s) for which user-plane resources were active prior to receiving the fallback indication.

In certain examples, sending the CPSR message may comprise sending the CPSR message without performing an access barring check when sending the CPSR message.

In certain examples, sending the CPSR message may comprise sending the CPSR message without performing an access barring check when sending the CPSR message if the CPSR message includes CIoT user data or the CPSR message is for CIoT user data transfer over the control plane.

In certain examples, the method may further comprise: if the UE is using control plane CIoT 5GS optimisation, re-establishing the NAS connection by sending the CPSR message; and if the UE is not using control plane CIoT 5GS optimisation, or if the UE is using user plane CIoT 5GS optimisation, re-establishing the NAS connection by sending a Service Request message.

Certain examples of the present disclosure provide a method for a User Equipment (UE), wherein the UE is in 5GMM-CONNECTED mode with RRC inactive indication, the method comprising: establishing a PDU session for sending data over the user plane; determining that there is user data to be sent over the user plane; determining that there is no pending NAS procedure; and upon receiving a fallback indication from the lower layers, in response to the determining, entering 5GMM-IDLE mode.

In certain examples, the method may further comprise: if the UE is using control plane CIoT 5GS optimisation, sending a Control Plane Service Request (CPSR) message including at least a portion of the data.

In certain examples, sending the CPSR message may comprise sending the CPSR message if the UE is re-establishing a NAS connection following the fallback indication, and the UE has data to send over the user plane but does not have a pending NAS procedure before the fallback indication is received.

In certain examples, the CPSR may further include a PDU session identity corresponding to the PDU session.

In certain examples, the CPSR message may comprise an Uplink data status IE indicating the PDU session(s) for which user-plane resources were active prior to receiving the fallback indication.

Certain examples of the present disclosure provide a method for a User Equipment (UE), wherein the UE is in 5GMM-CONNECTED mode with RRC inactive indication, the method comprising: in response to receiving, from lower layer, a suspend indication, determining the type of the suspend indication; and entering a NAS mode according to the determined type of the suspend indication.

In certain examples, entering the NAS mode according to the determined type of the suspend indication may comprise: if the suspend indication is a first type indicating a suspend in the lower layers due to the RRC entering RRC_inactive state, entering 5GMM-CONNECTED mode with RRC inactive indication.

In certain examples, entering the NAS mode according to the determined type of the suspend indication may comprise: if the suspend indication is a second type indicating a suspend due to the use of user plane CIoT 5GS optimisation, entering 5GMM-IDLE mode with suspend indication.

In certain examples, the second type of suspend indication may be provided by the lower layers to the NAS upon suspension of an RRC connection/state in the lower layers due to the use of user plane CIoT 5GS optimisation.

In certain examples, the method may further comprise: in response to receiving, from lower layer, a resume indication, determining the type of the resume indication; and entering a NAS mode according to the determined type of the resume indication.

In certain examples, entering the NAS mode according to the determined type of the resume indication may comprise: if the resume indication is a first type indicating a resume after entering RRC_CONNECTED from RRC_inactive state, entering 5GMM-CONNECTED mode; and if the resume indication is a second type indicating resuming an RRC connection as part of user plane CIoT 5GS optimization, entering 5GMM-CONNECTED mode.

Certain examples of the present disclosure provide a method for a User Equipment (UE), wherein the UE is in 5GMM-CONNECTED mode with RRC inactive indication, the method comprising: establishing a PDU session for sending data over the control plane; determining that there is data to be sent in an UL NAS TRANSPORT message; in response to the determining, requesting lower layers to resume an RRC connection; upon receiving a fallback indication from the lower layers in response to the requesting, entering 5GMM-IDLE mode; and if the UE is using control plane CIoT 5GS optimisation, sending a Control Plane Service Request (CPSR) message including at least a portion of the data and a PDU session identity corresponding to the PDU session.

In certain examples of the present disclosure, the data to be sent in the UL NAS TRANSPORT message may comprise multiple payloads including CIoT user data and one or more other payload types, the data included in the CPSR message may comprise the CIoT user data, and the method may further comprise: transitioning to 5GMM-CONNECTED mode; and performing a procedure to send the data of the one or more other payload types.

In certain examples of the present disclosure, the CPSR message may comprise an Uplink data status IE indicating the PDU session(s) for which user-plane resources were active prior to receiving the fallback indication.

In certain examples of the present disclosure, sending the CPSR message may comprise sending the CPSR message without performing an access barring check when sending the CPSR message.

In certain examples of the present disclosure, the method may further comprise: if the UE is using control plane CIoT 5GS optimisation, re-establishing the NAS connection by sending the CPSR message; and if the UE is not using control plane CIoT 5GS optimisation, or if the UE is using user plane CIoT 5GS optimisation, re-establishing the NAS connection by sending a Service Request message.

Certain examples of the present disclosure provide a method for a User Equipment (UE), wherein the UE is in 5GMM-CONNECTED mode with RRC inactive indication, the method comprising: in response to receiving, from lower layer, a suspend indication, determining the type of the suspend indication; and entering a NAS mode according to the determined type of the suspend indication.

In certain examples of the present disclosure, entering the NAS mode according to the determined type of the suspend indication may comprise: if the suspend indication is a first type indicating a suspend in the lower layers due to the RRC entering RRC_inactive state, entering 5GMM-CONNECTED mode with RRC inactive indication; and if the suspend indication is a second type indicating a suspend due to the use of user plane CIoT 5GS optimisation, entering 5GMM-IDLE mode with suspend indication.

In certain examples of the present disclosure, the method may further comprise: in response to receiving, from lower layer, a resume indication, determining the type of the resume indication; and entering a NAS mode according to the determined type of the resume indication.

In certain examples of the present disclosure, entering the NAS mode according to the determined type of the resume indication may comprise: if the resume indication is a first type indicating a resume after entering RRC_CONNECTED from RRC_inactive state, entering 5GMM-CONNECTED mode; and if the resume indication is a second type indicating resuming an RRC connection as part of user plane CIoT 5GS optimization, entering 5GMM-IDLE mode without suspend indication or resume the RRC connection.

Certain examples of the present disclosure provide a User Equipment (UE) configured to operate according to a method according to any of the examples disclosed herein.

Certain examples of the present disclosure provide one or more other suitable types of network entity configured to operate in cooperation with a UE according to any of the examples disclosed herein.

Certain examples of the present disclosure provide a network comprising a UE and one or more other network entities configured to operate according to any of the examples disclosed herein.

FIG. 5 is a block diagram of an exemplary an entity that may be used in examples of the present disclosure. The skilled person will appreciate that the entity illustrated in FIG. 5 may be implemented, for example, as a network element on a dedicated hardware, as a software instance running on a dedicated hardware, and/or as a virtualised function instantiated on an appropriate platform, e.g. on a cloud infrastructure.

Referring to FIG. 5, the entity 500 can configured with one of a UE, an apparatus, a device and a network entity. The entity 500 comprises at least one processor (or controller) 501, a transmitter 503 and a receiver 505. The receiver 505 is configured for receiving one or more messages from one or more other entities. The transmitter 503 is configured for transmitting one or more messages to one or more other entities. The at least one processor 501 is configured for performing operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

The invention claimed is:

1. A method for a user equipment (UE), the method comprising:

identifying that the UE is in 5th generation mobility management (5GMM)-CONNECTED mode with radio resource control (RRC) inactive indication;

in case that the UE initiates a network access stratum (NAS) transport procedure, requesting lower layers to transition to an RRC connection state; and in response to receiving a fallback indication from the lower layers based on the requesting, entering 5GMM-IDLE mode and, in case that the UE is using control plane cellular Internet of things (CIoT) 5th generation system (5GS) optimization, transmitting a control plane service request (CPSR) message including data, wherein the data comprises at least one of a short message service (SMS), a location serviced message, or CIoT user data.

2. The method of claim 1, wherein transmitting the CPSR message comprises transmitting the CPSR message in case that the UE is re-establishing a NAS connection following the fallback indication, wherein the UE has the data to send over the control plane before the fallback indication is received, and wherein the CPSR message includes a protocol data unit (PDU) session identity corresponding to an established PDU session.

3. The method of claim 1, wherein the CPSR message comprises an uplink data status information element (IE) indicating at least one PDU session for which user-plane resources were active prior to receiving the fallback indication.

4. The method of claim 1, further comprising:

transitioning to the 5GMM-CONNECTED mode; and performing a procedure to transmit the data of one or more other payload types.

5. The method of claim 1, wherein transmitting the CPSR message comprises transmitting the CPSR message without performing an access barring check when transmitting the CPSR message.

6. The method of claim 1, wherein transmitting the CPSR message comprises transmitting the CPSR message without performing an access barring check when transmitting the CPSR message in case that the CPSR message includes CIOT user data or the CPSR message is for CIoT user data transfer over a control plane.

7. The method of claim 1, further comprising:

in case that the UE is using control plane CIOT 5GS optimization, re-establishing a NAS connection by transmitting the CPSR message; and in case that the UE is not using control plane CIoT 5GS optimization, or in case that the UE is using user plane CIoT 5GS optimization, re-establishing the NAS connection by transmitting a service request message.

8. A user equipment in a wireless communication, the UE comprising:

a transceiver configured to transmit and receive; and at least one processor configured to:

identify that the UE is in 5th generation mobility management (5GMM)-CONNECTED mode with radio resource control (RRC) inactive indication;

in case that the UE initiates a network access stratum (NAS) transport procedure, request lower layers to transition to an RRC connection state; and in response to receiving a fallback indication from the lower layers based on the requesting, enter 5GMM-IDLE mode and, in case that the UE is using control plane cellular Internet of things (CIoT) 5th generation system (5GS) optimization, transmit a control plane service request (CPSR) message including data, wherein the data comprises at least one of a short message service (SMS), a location serviced message, or CIoT user data.

9. The UE of claim 8, wherein the at least one processor is configured to transmit the CPSR message in case that the UE is re-establishing a NAS connection following the fallback indication, wherein the UE has the data to send over a control plane before the fallback indication is received, and wherein the CPSR message includes a protocol data unit (PDU) session identity corresponding to an established PDU session.

10. The UE of claim 8, wherein the CPSR message comprises an uplink data status information element (IE) indicating at least one PDU session for which user-plane resources were active prior to receiving the fallback indication.

11. The UE of claim 8, wherein the at least one processor is further configured to:

transition to the 5GMM-CONNECTED mode; and perform a procedure to transmit the data of one or more other payload types.

12. The UE of claim 8, wherein the at least one processor is further configured to:

in case that the UE is using control plane CIoT 5GS optimization, re-establish a NAS connection by transmitting the CPSR message, and in case that the UE is not using control plane CIoT 5GS optimization, or in case that the UE is using user plane CIoT 5GS optimization, re-establish the NAS connection by transmitting a service request message.

* * * * *